Aug. 23, 1966  W. P. SHULHOF  3,268,272

BEARING

Filed Dec. 23, 1963

INVENTOR.
William P. Shulhof
BY
Peter P. Kozak
ATTORNEY

United States Patent Office 3,268,272
Patented August 23, 1966

3,268,272
BEARING
William P. Shulhof, Flushing, Mich., assignor to General Motors Corporation, Detroit, Mich., a corporation of Delaware
Filed Dec. 23, 1963, Ser. No. 332,698
12 Claims. (Cl. 308—1)

The present invention relates generally to bearings and more particularly to precision bearings, such as those which find particular utility in gyroscopes and other components for guidance and instrumentation systems.

The present invention has as its principal object the provision of an improved durable bearing having a considerable amount of inherent lubricity. It is another object of the present invention to provide a precision light-duty bearing wherein the material of at least one of the bearing elements has a low coefficient of friction, good structural strength and excellent resistance to chemical and physical degradation so that the bearing has excellent inherent lubricity, a high degree of corrosion and wear resistance, and durability.

These and other objects are accomplished in accordance with the present invention by provision of a bearing wherein at least the surface portions of one or more of the elements thereof are formed of a rare earth metal fluoride having a graphite-like crystal structure and particularly those selected from the group consisting of lanthanum fluoride, cerium fluoride, praseodymium fluoride, neodymium fluoride, samarium fluoride and europium fluoride or mixtures thereof. Cerium fluoride and lanthanum fluoride are preferred compounds for use in accordance with the present invention.

The entire bearing element can be formed of the material as, for example, by sintering or a hot pressing operation followed by grinding and polishing. Also, the element can be made of a metal, ceramic or plastic material, polished and then coated with a thin layer of at least one of the rare earth fluoride materials having the graphite-like crystal structure. Where light weight and high structural strength are desired, as is the case where the bearing is intended for use in a missile guidance system gyroscope or other component, beryllium has particular advantage as the base material.

The above and other objects, advantages and features of the invention will appear more clearly from the following description of various embodiments thereof made with reference to the accompanying drawings, in which.

As is well-known, graphite exhibits a high degree of inherent lubricity due to the orientation of the atoms of the graphite crystal lattice in multiple parallel atomic planes which are joined by relatively weak interplanar bonds. Consequently, when the graphite crystal is subjected to shearing forces, the multiple planes of atoms readily slide over one another, which accounts for the high degree of inherent lubricity exhibited by graphite.

The several fluorides of the lanthanide series of rare earth metals, which consist of the elements of atomic numbers 57 through 71, have a crystal structure which closely resembles graphite, since the crystal lattice of these compounds consists of generally parallel planes of atoms joined by weak interplanar bonds. Thus, the rare earth metal fluorides having the aforesaid graphite-like crystal structure and particularly the group consisting of lanthanum fluoride, cerium fluoride, praseodymium fluoride, neodymium fluoride, samarium fluoride, and europium fluoride also exhibit a high degree of inherent lubricity.

Figure 1:
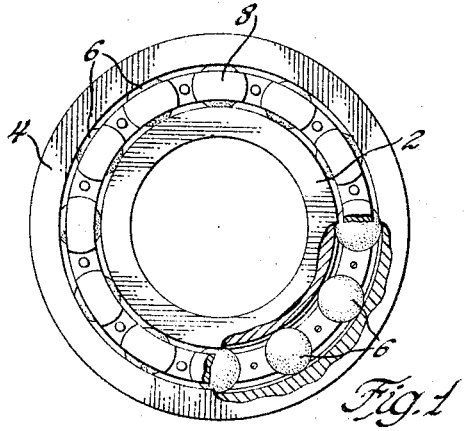
FIGURE 1 is a side view of a ball bearing assembly embodying the invention.

Referring now to FIGURE 1 illustrating one embodiment of the present invention, the ball bearing assembly shown comprises inner and outer metal races 2 and 4, respectively, and ball elements 6 which are maintained in position between the races and separated from each other by cage 8. The ball elements are made of cerium fluoride and by reason of their being made of this material have a high degree of inherent lubricity. In manufacturing the bearing, the ball elements can be formed by hot pressing powdered cerium fluoride at about 1000° C. and about 500 to 5,000 p.s.i. pressure, and then ground and polished by conventional techniques. If desired, the ball elements, instead of consisting entirely of cerium fluoride, can comprise a polished metal ball formed by conventional techniques and subsequently coated with a thin layer of cerium fluoride. The thin cerium fluoride coating may be conveniently applied to the metal ball elements by supporting them in an evacuated chamber in which cerium fluoride is initially vaporized and then allowed to condense on the surfaces of the metal ball elements to form the coating which has a high degree of inherent lubricity.

It will be understood that while, in the embodiment described above, only the ball elements are of cerium fluoride, the inner and outer races may, in accordance with the invention be similarly formed of cerium fluoride or be provided with a surface coating of cerium fluoride.

Figure 2:
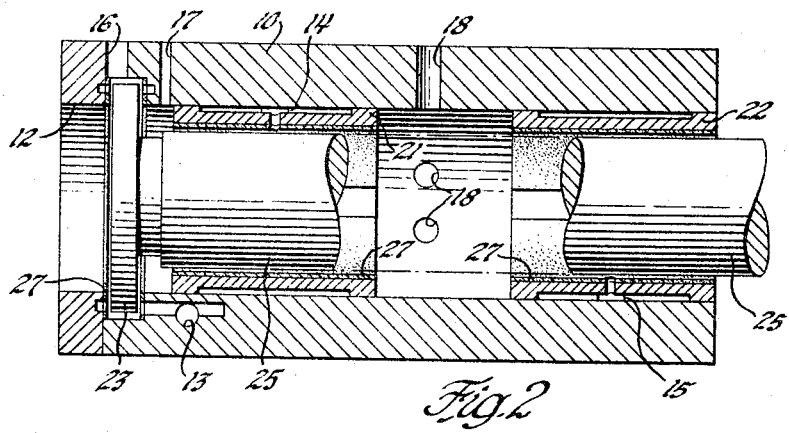
FIGURE 2 is a sectional view of a pneumatic bearing incorporating the invention.

In FIGURE 2 there is shown a pneumatic bearing embodying the invention. The particular bearing illustrated is of the type covered by United States Patent No. 2,756,-115, issued July 24, 1956, to R. O. Michel, assigned to the assignee of the present invention, and includes a casing 10 having a throughbore 12 with a plurality of pressurized air inlet ports 13, 14 and 15 and a plurality of exhaust ports 16, 17 and 18. Disposed within the throughbore are a pair of axially spaced bushings 21 and 22 the inner surfaces of which constitute bearing surfaces. A shaft 25 which might, for example, be the shaft of an electric motor or a gyro, fits relatively snugly within the hollow bushings 21 and 22 with only sufficient clearance therebetween to provide space for a film of compressed air about portions of the shaft. An annular flange portion 23 of the shaft fits into a mating channel portion in the casing 10, the opposed end surfaces of the flange portion and the casing constituting a thrust bearing. Hence, the particular structure shown in both a radial bearing and a thrust bearing.

In accordance with the present invention, the inner surfaces of the bushings 21 and 22 and the casing inner surfaces to each side of the shaft flange portion 23 are provided with a thin coating 27 of cerium fluoride. This coating, which is shown with exaggerated thickness in FIGURE 2, substantially eliminates what has been one of the major problems with gas bearings, to wit, the binding and scoring which occurs between the contacting bearing elements during start-up and during slow-down when the gas pressure is not sufficient to maintain the elements separated.

Figure 3:
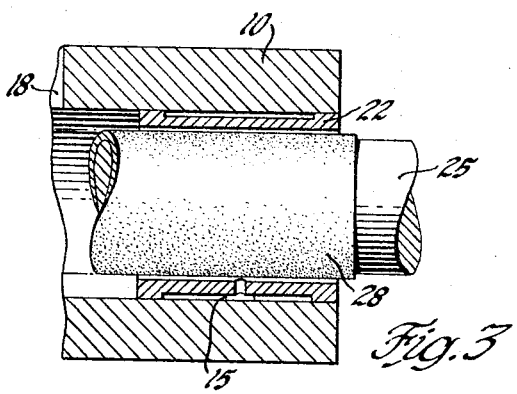
FIGURE 3 is a view in partial section and with parts broken away of a modification of the bearing shown in FIGURE 2.

The coating may, if desired, be applied to the shaft instead of or in addition to being applied to the bushings and casing. This is illustrated in FIGURE 3 which shows a bearing identical to that in FIGURE 2 except that the cerium fluoride coating is applied to the shaft as shown at 28.

The particular pneumatic bearing shown in FIGURE 2 is of the so-called hydrostatic-type wherein the gas support is supplied by suitable gas pressure means through ports in the bearing casing. However, the invention can also be used in the so-called hydrodynamic-type gas bearing wherein the structure and rotary speed of the one bearing element is such as to create air pressure sufficient to support that element. In such an embodiment, at least the surface portions of one or more of the bearing elements which are in contact prior to and during gas pressure buildup are formed of one of the aforementioned rare earth metal fluorides which have a graphite-like crystal structure. Preferably, cerium fluoride or lanthanum fluoride are employed.

It will be understood that while the invention has been described particularly with reference to certain embodiments thereof, it is not so limited since changes and modifications may be made, all within the full and intended scope of the claims which follow.

I claim:

1. A bearing comprising a pair of elements in moving surface contact with each other, the contacting surfaces of at least one of said elements being formed of a fluoride of at least one of the lanthanide series of rare earth metals, said rare earth metal fluoride having a graphite-like crystal structure.

2. A bearing comprising a pair of elements in moving surface contact with each other, the contacting surface of at least one of said elements having a high degree of inherent lubricity and being formed of a material selected from the group consisting of lanthanum fluoride, cerium fluoride, praseodymium fluoride, neodymium fluoride, samarium fluoride and europium fluoride.

3. A bearing comprising a pair of elements in moving surface contact with each other, the contacting surface of at least one of said elements being formed of cerium fluoride.

4. A bearing comprising a pair of elements in moving surface contact with each other, at least one of said elements being formed of a fluoride of the lanthanide series of rare earth metals, said rare earth metal fluorides having a graphite-like crystal structure.

5. A bearing comprising a pair of elements in moving surface contact with each other, at least one of said elements being formed of a material selected from the group consisting of lanthanum fluoride, cerium fluoride, praseodymium fluoride, neodymium fluoride, samarium fluoride and europium fluoride.

6. A bearing comprising a pair of elements in moving surface contact with each other, at least one of said elements being formed of cerium fluoride.

7. A bearing comprising a pair of elements in moving surface contact with each other, at least one of said elements being formed of a backing member having a coating thereon, said coating being formed of a material selected from the group consisting of lanthanum fluoride, cerium fluoride, praseodymium fluoride, neodymium fluoride, samarium fluoride and europium fluoride.

8. A bearing comprising a pair of elements in moving surface contact with each other, at least one of said elements being formed of a metal member having a coating thereon of a material selected from the group consisting of lanthanum fluoride, cerium fluoride, praseodymium fluoride, neodymium fluoride, samarium fluoride and europium fluoride.

9. A bearing comprising a pair of elements in moving surface contact with each other, at least one of said elements being formed of a metal member having a coating of cerium fluoride.

10. A pneumatic bearing comprising a pair of elements with opposed surfaces movable with respect to each other, at least one of said elements having its surface formed of a fluoride of the lanthanide series of rare earth metals, said rare earth metal fluorides having a graphite-like crystal structure and possessing a high degree of inherent lubricity, and means for creating gas pressure between the opposed surface of said elements to cause separation thereof.

11. A pneumatic bearing comprising a pair of elements with opposed surfaces movable with respect to each other, at least one of said elements having its surface formed of lanthanum fluoride, cerium fluoride, praseodymium fluoride, neodymium fluoride, samarium fluoride and europium fluoride, and means for creating gas pressure between the opposed surface of said elements to cause separation thereof.

12. A pneumatic bearing comprising a pair of elements with opposed surfaces movable with respect to each other, at least one of said elements having its surface formed of cerium fluoride, and means for creating gas pressure between the opposed surface of said elements to cause separation thereof.

References Cited by the Examiner

Rare Earths, Edited by Spredding and Daane, published by John Wiley and Sons, Inc., 1963.

FRANK SUSKO, *Primary Examiner.*